(12) United States Patent
Sprague (10) Patent No.: US 9,555,853 B2
(45) Date of Patent: Jan. 31, 2017

(54) PROPULSION SYSTEM FOR HUMAN POWERED VEHICLES

(71) Applicant: Paul Sprague, Sandy, UT (US)

(72) Inventor: Paul Sprague, Sandy, UT (US)

(*) Notice: Subject to any disclaimer, the term of this patent is extended or adjusted under 35 U.S.C. 154(b) by 113 days.

(21) Appl. No.: 14/167,426

(22) Filed: Jan. 29, 2014

(65) Prior Publication Data

US 2014/0210179 A1   Jul. 31, 2014

Related U.S. Application Data

(60) Provisional application No. 61/849,604, filed on Jan. 30, 2013.

(51) Int. Cl.
*B62M 1/36* (2013.01)
*B62M 1/26* (2013.01)

(52) U.S. Cl.
CPC .......... *B62M 1/26* (2013.01); *B62M 1/36* (2013.01)

(58) Field of Classification Search
CPC ............. B62M 1/24; B62M 1/26; B62M 1/28; B62M 1/36; B62M 2003/006; B62M 3/06; B62M 1/30
USPC ................................. 280/252, 256, 259–262
See application file for complete search history.

(56) References Cited

U.S. PATENT DOCUMENTS

| | | | |
|---|---|---|---|
| 1,427,589 A | 8/1922 | Greenison | |
| 1,800,123 A * | 4/1931 | Wagen | B62K 3/002 280/221 |
| 4,026,571 A | 5/1977 | Vereyken | |
| 4,561,318 A | 12/1985 | Schirrmacher | |
| 5,442,972 A * | 8/1995 | Hoover | B62M 1/26 280/262 |
| 5,540,111 A | 7/1996 | Barnett et al. | |
| 5,716,069 A | 2/1998 | Bezerra et al. | |
| 5,997,020 A | 12/1999 | Borg | |
| 6,209,900 B1 | 4/2001 | Yoshizawa | |
| 6,454,287 B1 | 9/2002 | Fujiwara et al. | |
| 6,830,259 B2 | 12/2004 | Jakovljevic | |

(Continued)

FOREIGN PATENT DOCUMENTS

| | | |
|---|---|---|
| EP | 1116646 A1 | 7/2001 |
| GB | 2359285 B | 8/2001 |
| WO | WO 2010/121394 A1 | 10/2010 |

OTHER PUBLICATIONS

PCT Application PCT/US14/13570; filed Jan. 29, 2014; Paul Sprague; International Search Report mailed May 15, 2014.

*Primary Examiner* — Anne Marie Boehler
(74) *Attorney, Agent, or Firm* — Thorpe North & Western (57) ABSTRACT

A propulsion system for human powered vehicles includes an outer lever having an input end and an output end. An orbiting sprocket is coupled to the output end of the outer lever. A fixed sprocket is also provided, with the orbiting sprocket orbiting around the fixed sprocket. A closed tension-bearing member engages an outer circumference of both the orbiting sprocket and the fixed sprocket. A driveshaft is co-axial with the fixed sprocket, the driveshaft being free to rotate with respect to the fixed sprocket and the crank lever being fixedly connected to the driveshaft and rotationally connected to the orbiting sprocket. A chassis is propelled by the driveshaft. Wherein application of a force on the input end of the outer lever causes the orbiting sprocket to orbit around the fixed sprocket and thereby rotate the crank lever to impart rotation to the driveshaft and propel the chassis.

20 Claims, 6 Drawing Sheets

(56) References Cited

U.S. PATENT DOCUMENTS

| | | |
|---|---|---|
| 7,510,201 B2 | 3/2009 | Scarborough |
| 7,753,387 B2 | 7/2010 | Wei |
| 7,938,419 B2 | 5/2011 | Leslie |
| 7,938,420 B1 | 5/2011 | Mirabile |
| 7,988,169 B2 | 8/2011 | Baek et al. |
| 8,210,553 B2 * | 7/2012 | Fan ................. B62K 3/002 |
| | | 280/221 |
| 8,465,038 B2 | 6/2013 | Scarborough |
| 2004/0150186 A1 | 8/2004 | Jakovljevic |
| 2005/0263978 A1 * | 12/2005 | Ascher ............... B62K 15/006 |
| | | 280/261 |
| 2008/0277896 A1 | 11/2008 | Lee et al. |
| 2011/0031715 A1 | 2/2011 | Lin |

* cited by examiner

PROPULSION SYSTEM FOR HUMAN POWERED VEHICLES

PRIORITY CLAIM

Priority is claimed to U.S. Provisional Patent Application Ser. No. 61/849,604, filed Jan. 30, 2013, which is hereby incorporated herein by reference in its entirety.

BACKGROUND

Field of the Invention

The present invention relates generally to human powered vehicles. More particularly, the present invention relates to vehicles similar in operation to bicycles, and methods of propulsion of such vehicles by their riders.

Related Art

The present invention relates generally to the propulsion systems typically used in human powered vehicles. Typically these systems translate rotational torque input provided by a rider into forward propulsion by translating such rotational torque into a rotational torque applied to a drive wheel. Such systems often include a chain or belt-drive that, by having changeable gearing ratios, offers a variety of torque ratios between the input by the user and the output to the drive wheel.

While such systems have been used for a number of years, limitations remain as to the variations that are achievable with the input torque applicable by the vehicles rider.

SUMMARY OF THE INVENTION

It has been recognized that it would be advantageous to develop a propulsion system which increases the torque input of the rider significantly while maintaining a sufficiently small size of the vehicle and reciprocating within a range of motion which would be comfortable to a user in such a manner that the vehicle can be located on a bicycle or other human powered vehicle.

The invention provides a propulsion system for human powered vehicles having an outer lever having an input end and an output end, the outer lever being configured to receive a force input from a human limb at the input end. The outer lever drives an orbiting sprocket being coupled to the output end of the outer lever. The orbiting sprocket orbits around a fixed sprocket, wherein and the orbiting sprocket and the fixed sprocket are located in a substantially common plane, and are offset one from another. A closed tension-bearing member, i.e. a chain or a belt, circumvents the fixed sprocket and the orbiting sprocket engaging an outer circumference of both the orbiting sprocket and the fixed sprocket. A driveshaft passes through a central portion of the fixed sprocket, the driveshaft being free to rotate with respect to the fixed sprocket. A crank lever spans the distance between the fixed sprocket and the orbiting sprocket, the crank lever maintaining the relative distance between the orbiting sprocket and the fixed sprocket, the crank lever being fixedly connected to the driveshaft and rotationally connected to the orbiting sprocket. A chassis, which is propelled by the driveshaft, wherein application of a force on the input end of the outer lever causes the orbiting sprocket to orbit around the fixed sprocket and thereby rotate the crank lever to impart rotation to the driveshaft and thus propel the chassis.

In accordance with another aspect of the present invention, the invention provides a leveraged propulsion system for human powered vehicle having an outer lever having an input end and an output end, the outer lever being configured to receive a force input from a human limb at the input end. The force input on the outer lever drives an orbiting sprocket that is coupled to the output end of the outer lever. The orbiting sprocket is driven to orbit around a fixed sprocket. The orbiting sprocket and the fixed sprocket are each located in a substantially common plane, and are offset one from another. A first closed tension-bearing member engages an outer circumference of both the orbiting sprocket and the fixed sprocket. A driveshaft passes through a central portion of the fixed sprocket, wherein the driveshaft is free to rotate with respect to the fixed sprocket. A crank lever spans the distance between the fixed sprocket and the orbiting sprocket, wherein the crank lever maintains a relative distance between the orbiting sprocket and the fixed sprocket, the crank lever being fixedly connected to the driveshaft and rotationally connected to the orbiting sprocket.

Additionally, a drive sprocket located on the driveshaft, and a drive wheel is provided which has a drive-hub wherein the drive hub has a freewheel drive device. The freewheel drive device and the drive sprocket are connected by a second closed tension-bearing member such that the rotation of the driveshaft can be transferred to the drive wheel. The drive wheel is configured to drive a chassis wherein application of a force on the input end of the outer lever causes the orbiting sprocket to orbit around the fixed sprocket and thereby rotate the crank lever that imparts rotation to the driveshaft and thereby provide rotation to the drive wheel which thereby imparts propulsion to the vehicle.

In accordance with another aspect of the present invention, the invention provides method for propelling a human powered vehicle wherein the method includes providing an outer lever having an input end and an output end, the outer lever being configured to receive a force input from a human limb at the input end. An orbiting sprocket is provided which is affixed to the output end of the outer lever, the output end of the outer lever being rigidly affixed to the orbiting sprocket. Additionally, a fixed sprocket is provided, wherein the orbiting sprocket orbits around the fixed sprocket and the orbiting sprocket and the fixed sprocket are located in a substantially common plane, have a common radius, and are offset from one another. A first closed tension-bearing member circumvents the orbiting sprocket and the fixed sprocket so as to engage an outer circumference of both the orbiting sprocket and the fixed sprocket. Also a crank lever is provided which spans the distance between the fixed sprocket and the orbiting sprocket wherein the crank lever is configured to maintain a relative distance between the orbiting sprocket and the fixed sprocket. In order to provide propulsion to the system a force is applied to the input end of the outer lever so as to cause the orbiting sprocket to orbit around the fixed sprocket wherein the orbiting motion of the orbiting sprocket drives the crank lever and causes the crank lever to rotate about a driveshaft which thereby propels the human powered vehicle.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

One of the many problems encountered in the world of human powered vehicles is that the human body, unlike internal combustion or electric motors, is more adept at producing a slowly repeated and sustained high force or torque rather than a fast reciprocating force. Many systems that presently exist are unable to harness these high forces without being overly robust or without other significant setbacks. For example, typical bicycle drive systems utilize chains that often break under the high torque loads that a person may apply to the pedals. These chains are often long and thin and greatly limit the amount of torque that may be applied to the pedals.

Other drawbacks lie in the fact that the length of a conventional pedal crank arm is greatly limited. This pedal crank arm length is limited because the crank arm moves in a complete circle, requiring that the person's foot that is driving the pedals also move the circumference of the circle. This required motion limits the pedal length because a person's leg can only move a certain distance, with slight variation based on rider height. A typical bike crank varies in length anywhere from 160 mm to 180 mm to account for this variation in leg length between people. Additionally, the crank length is limited by the distance of the center of the crank from the ground. If the pedal crank arm is too long, the pedal will come into contact with the ground, or contact terrain over which the bicycle is being ridden, as the pedal reaches its lowest point in its down-stroke.

Figure 1:
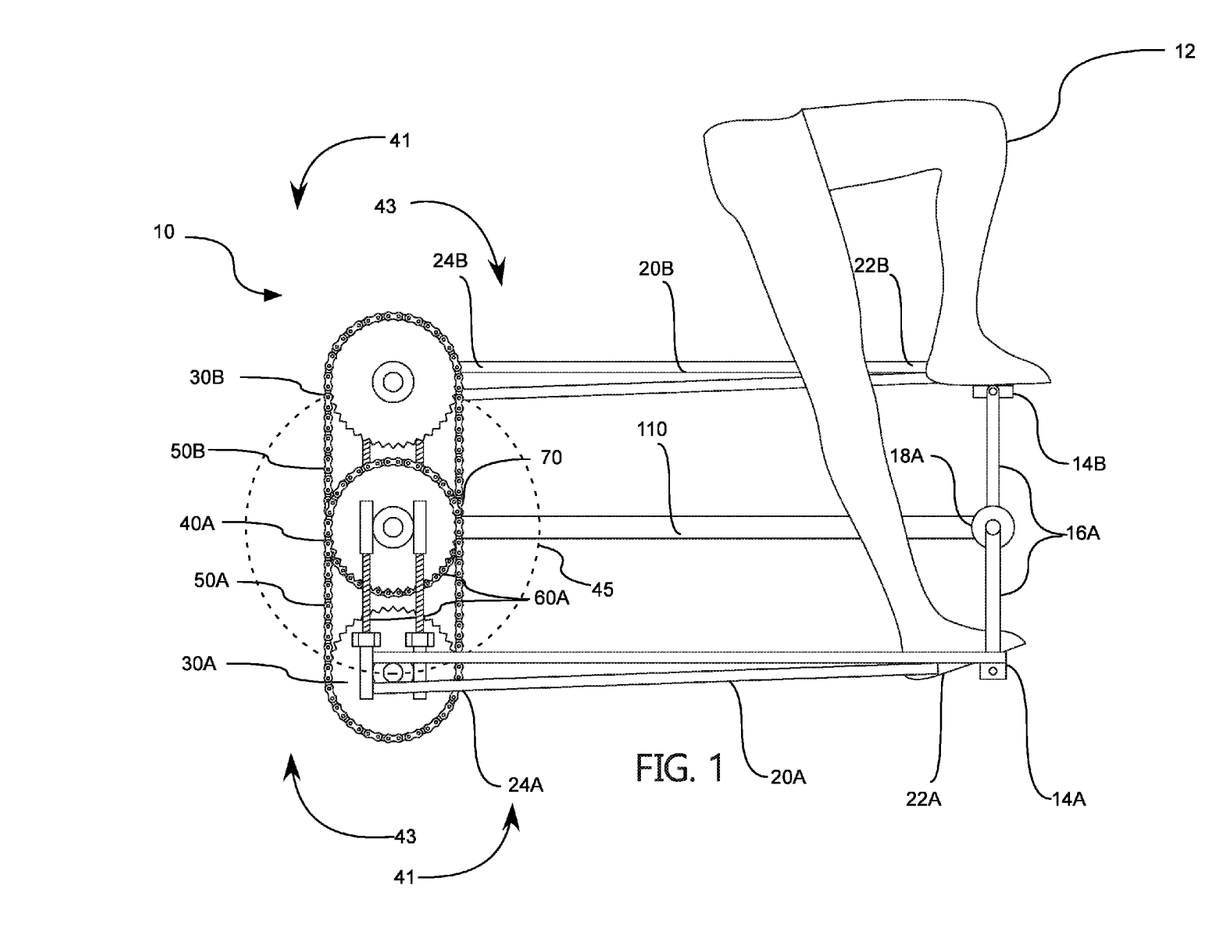
FIG. 1 is a side view of a propulsion system in accordance with an embodiment of the present invention, shown with portions of a rider engaging the system.
Figure 2:
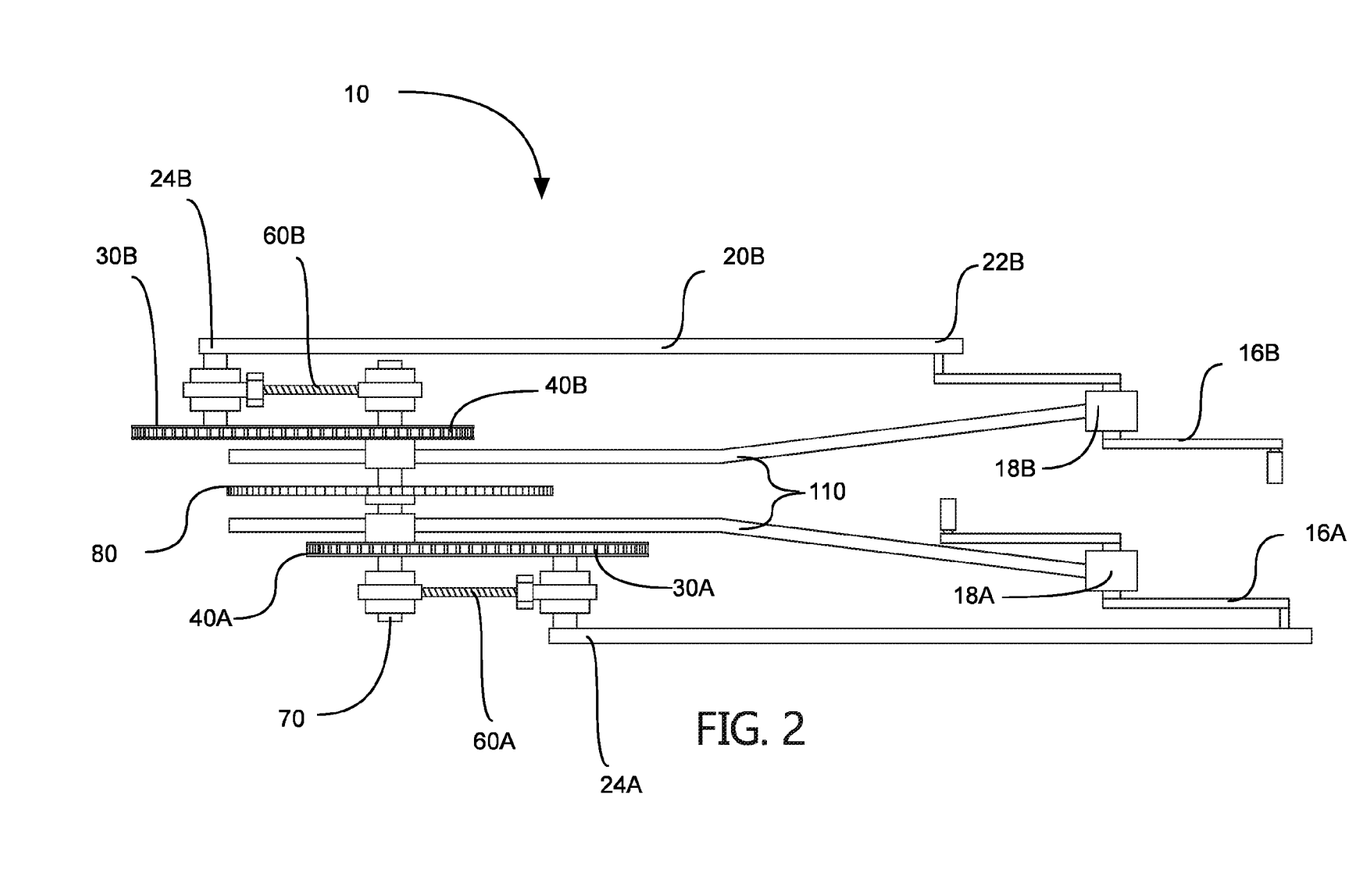
FIG. 2 is a top view of the propulsion system of FIG. 1, sans the rider.

The present technology addresses these limitations, and is shown by example in in the figures. As best seen in FIGS. 1-2, the orbiting drive system 10 provides a leverage drive system which translates an applied reciprocating force from the legs of a bicycle rider 12 into a propulsion force for propelling a human powered vehicle, the frame or chassis of which is indicated at 110. The leverage of the present system may be increased drastically over the prior art bicycle pedaling systems. This increased leverage is achieved by providing a pair of relatively long outer levers 20A and 20B working in conjunction with an orbiting drive system. The orbiting drive system allows for the outer levers 20A and 20B to be several times longer in length than a typical bicycle crank. This allows the system to provide a much longer input lever arm while moving in an orbital fashion rather than a circular motion.

The torque being applied to the orbiting drive system 10 is achieved by applying an upward or downward force to the input ends 22A and 22B of respective outer levers 20A and 20B. These outer levers 20A and 20B may be driven directly by the rider's feet on input ends 22A and 22B of the outer levers 20A and 20B (which would apply a downward force). Alternatively, the outer levers 20A and 20B may be driven by intermediate pedals 14A and 14B. The pedals can be attached to pedal cranks 16 that can spin on a bottom bracket 18A. This acts as a rotational bearing such that applying a downward force on a pedal actually creates an upward force on the input end of its respective outer lever arm.

Discussion will now be directed to the right side of the orbiting drive system, with the understanding that each of the features and functionalities discussed with respect to the right side may be similarly applied to the left side of the orbiting drive system.

As discussed above, the outer lever 20A has an input end 22A for receiving a force input. The outer lever 20A also has an output end 24A. The output end 24A is coupled to an orbiting sprocket 30A. A closed tension-bearing member 50A, i.e. a belt or a chain, engages the outer portion of the orbiting sprocket 30A and circumscribes the orbiting sprocket 30A as well as a fixed sprocket 40A. The fixed sprocket 40A and the orbiting sprocket 30A each have similar radii; that is, they have the same number of teeth in the case of a geared sprocket with a chain, or a common radius if using a belt drive.

A distance between the fixed sprocket 40A and the orbiting sprocket 30A is maintained by an adjustable crankshaft 60A which is provided as a pair of threaded rods. It should be appreciated, while a pair of threaded rods has been shown to be advantageous for purposes of the present invention, one of ordinary skill in the art would recognize that any number of threaded rods may provide adequate adjustability of this relative distance. These threaded rods, as will be discussed below, act as crankshafts for translating the orbital motion of the orbiting sprocket into rotational motion of a driveshaft.

The orbiting motion of the orbiting sprockets is achieved by having a rotationally rigid connection between the output end 24A of the outer lever 20A and the orbiting sprocket 30A. Having a rotationally rigid connection between these two components allows a moment, i.e. a torque, applied to the outer lever 20A to also cause a moment to be applied to the orbiting sprocket 30A. Typically such a moment would cause the orbiting sprocket 30A to spin. However, the closed tension-bearing member 50A, hereinafter referred to as a chain, which circumvents both the orbiting sprocket 30A and the fixed sprocket 40A, serves to prevent the orbiting sprocket 30A from spinning and instead applies a tension to the chain 50A. On the right side, a downward force would cause tension on the front side of the chain between the orbiting sprocket 30A and the fixed sprocket 40B, which tension actually pulls the orbiting sprocket 30A and causes it to orbit in a counterclockwise direction 41 around the fixed sprocket 40A (as viewed in FIG. 1). Similarly on the left side, a downward force on the outer lever 20B causes a tension on the chain 50B on the back side of the chain between the orbiting sprocket 30B and the fixed sprocket 40B, thus causing the orbiting sprocket 30B to orbit counter clockwise around the fixed sprocket (hidden from view in FIG. 1, but viewable in FIG. 2).

This orbiting motion of the orbiting sprockets around the fixed sprockets is translated into rotation of a driveshaft 70. The orbiting sprockets 30A and 30B each have an adjustable crankshaft 60A and 60B respectively. Similar to the discussion above, reference will now be made to the right side of the orbiting drive system 10, with the understanding that any features and functionalities discussed with respect to the right side are similarly applicable to the left side. The crankshaft 60A is connected to the orbiting sprocket via a rotationally free connection. Meaning that as the orbiting sprocket 30A orbits around the fixed sprocket 40A, the crankshaft 60A is allowed to rotate with respect to the orbiting sprocket 30A. At the end of the crankshaft opposite the connection to the orbiting sprocket 30A, the crankshaft 60A is provided with a rotationally rigid connection to the driveshaft 70. This causes the crankshaft 60A to move in a circular pattern following the orbiting motion of the orbiting sprocket 30A where the crankshaft 60A defines the radius of the circle of rotation (e.g., 45 in FIGS. 1 and 3). The rotationally rigid connection between the crankshaft 60A and the driveshaft 70 allows the orbiting of the orbiting sprocket 30A to drive a rotation of the driveshaft 70. On the driveshaft a drive sprocket 80 may also be provided in order to provide propulsion to the system.

It should also be appreciated that in the illustrated exemplary embodiment of the present invention, the driveshaft 70 passes through a central portion of the fixed sprocket 40A and is allowed to rotate freely with respect to the fixed sprocket. However, as one of ordinary skill in the art would recognize, the crankshaft 60A could be provided on the central or inner portion of the driveshaft with respect to the fixed sprocket; in this case, the need for the driveshaft 70 to pass through the central portion of the fixed sprocket 40A could be eliminated.

With further reference to FIGS. 1-2, it should be noted that application of a direct downward force upon the outer levers 20A and 20B causes orbiting sprockets 30A and 30B to move in a counter clockwise manner 41 (as viewed from the side in FIG. 1). This counterclockwise orbiting actually results in what would typically be considered backward rotation of the various sprockets, were they used in a conventional bicycle arrangement. It should be appreciated that numerous mechanical methods, including belts, chains, sprockets, transmissions, or any other number of transfer methods may be employed to translate this rotation into a forward driving means.

For purposes of the present illustration, a set of pedal cranks 16A and 16B have been respectively coupled to the outer levers 20A and 20B. By using pedal cranks 16A and 16B coupled to bottom brackets, i.e. bearings 18A and 18B respectively, an upward force is applied to the outer levers 20A and 20B which would result in a clockwise orbiting motion 43 of the orbiting sprockets 30A and 30B around respective fixed sprockets 40A and 40B (as illustrated in the side view of FIG. 1). This clockwise rotation 43 results in a clockwise rotation of the driveshaft which is more easily translated into a forward, i.e. rightward, motion of the vehicle when a downward force is applied to the pedals for example with drive sprocket 80 (FIG. 4).

Figure 3:
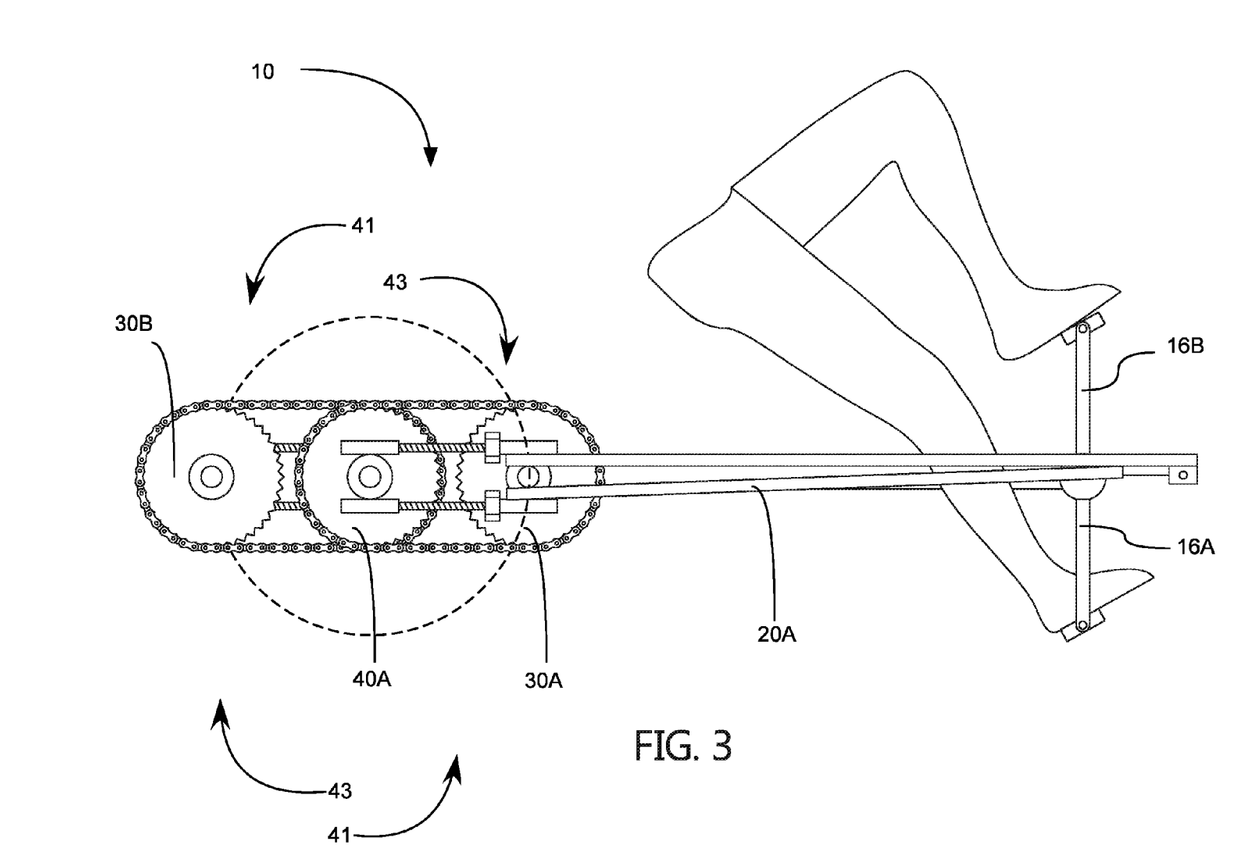
FIG. 3 is a side view of a propulsion system in accordance with an embodiment of the invention, incorporated into a recumbent cycle.

It should also be appreciated that numerous configurations of the pedals 16A, 16B can be achieved in order to provide this upward driving force on the outer levers. FIG. 3 depicts one such alternative configuration where the pedal cranks are oriented at 90 degrees from the outer levers rather than at 180 degrees as shown in FIGS. 1-2 in order to drive the outer levers 20A and 20B.

FIG. 3 also illustrates orbiting sprockets 30A and 30B rotated 90 degrees in a counter-clockwise direction 41, or alternatively 270 degrees in a clockwise direction 43, i.e. one quarter rotation, or a three quarter rotation depending on rotational direction, through an orbit around the fixed sprockets 40A and 40B (note that left side fixed sprocket 40B and left side outer lever 20B are hidden from view in this figure). The direction of orbit depends on whether a direct downward force is applied to the outer lever arms, or whether a pedal crank system 16A and 16B is utilized to provide an upward force on the outer lever arms or whether the pedals are being turned in a clockwise or a counter-clockwise direction. As shown in FIG. 3 a pedal crank system 16A and 16B is utilized thus a typical clockwise, or forward, rotation of the pedal crank system would result in a clockwise, or forward, orbit direction 43.

Figure 4:
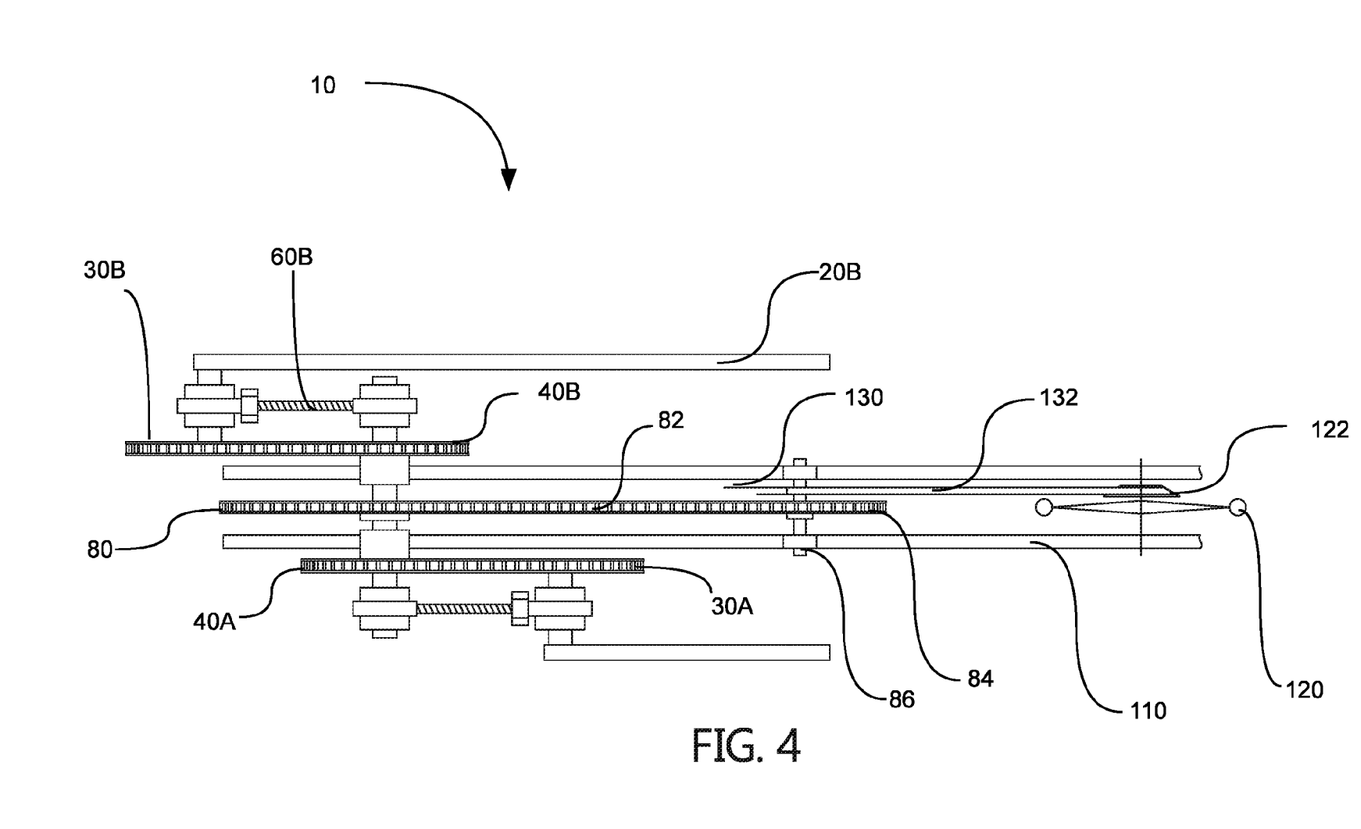
FIG. 4 is a top view of the propulsion system of FIG. 1, as implemented in a bicycle drivetrain.

FIG. 4 shows how the orbiting drive system 10 may be utilized to provide propulsion to the system via a bicycle wheel 120, or other wheel driven system. The orbiting drive system receives the torque input from outer levers 20A and 20B; this torque causes orbiting sprockets 30A and 30B to orbit around fixed sprockets 40A and 40B respectively. This orbiting motion drives adjustable crankshafts 60A and 60B to turn driveshaft 70. Affixed to driveshaft 70 is a drive sprocket 80 having an additional closed tension-bearing member, i.e. a belt or chain that drives a secondary drive sprocket 84 on a secondary drive axle 86. The secondary drive axle 86 also drives a front bicycle sprocket 130. The front bicycle sprocket 130 may be a belt drive sprocket or a chain drive sprocket. The front bicycle sprocket is connected, via bicycle drive tension-bearing member 132, to a drive hub 122 shown herein as a bicycle sprocket. It should be appreciated that the drive tension-bearing member 132 may be a bike chain or other some other bicycle type belt drive.

The drive tension-bearing member 132 may drive a bicycle sprocket 122 affixed to the central hub of a bicycle drive wheel 120. The bicycle sprocket 122 may be a multi-geared sprocket, i.e. a bicycle cassette that may utilize a typical bicycle derailleur to shift gears. In addition, the bicycle sprocket may be a belt driven sprocket where the bicycle hub is an internally shifted hub typical for Schwinn™ internal drive hub system, or Rohloff™ internal type hub system, as would be appreciated by one of ordinary skill. Additionally, the bicycle sprocket 122 may be a single geared hub. It is, however, generally advantageous that the hub utilize some sort of a "freewheel" type system which allows for the vehicle to coast without driving the entire system.

Not providing a "freewheel" at some point within the system may cause a dangerous condition for the rider should the rider be riding the vehicle at high speed, such as coasting down a steep hill. In such conditions, a non-freewheeling system might cause the pedals, orbiting sprockets, outer levers, etc. to move rather quickly and cause injury to the rider.

Figure 5:
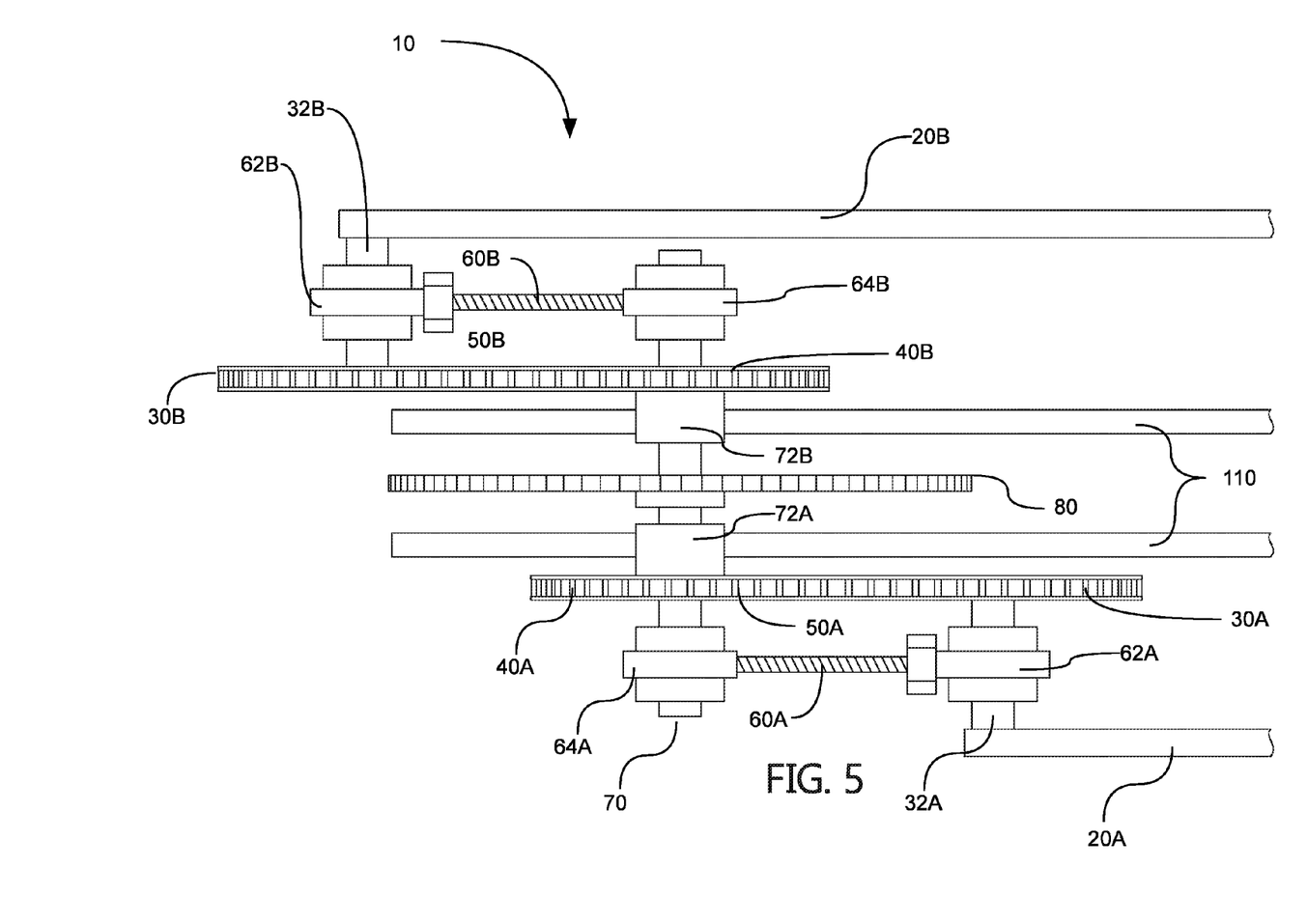
FIG. 5 is a more detailed, partial top view of the propulsion system of FIG. 1.

FIG. 5 shows an enlarged partial view of the orbiting drive system 10 in accordance with an exemplary embodiment. This figure better illustrates the various connections between the various components of the orbiting drive system 10. Beginning from the outer levers 20A and 20B, each of the outer levers 20A and 20B is coupled to a respective orbiting shaft 32A and 32B. The connection between each of the outer levers and the orbiting shafts is a rotationally rigid connection. The orbiting shafts 32A and 32B are coupled rigidly to their respective orbiting sprocket 30A and 30B, such that the torque applied by the outer levers can be transferred to the orbiting sprockets. The orbiting shafts 32A and 32B are each coupled to their respective adjustable crankshafts 60A and 60B via a rotational connection. This rotational connection is achieved via a bearing 62A and 62B, respectively. This rotational connection allows for the orbiting shafts 32A and 32B to spin with respect to each of their respective crank-shafts 60A and 60B such that, as the orbiting sprockets 30A and 30B orbit around their respective fixed sprockets 40A and 40B, the crankshafts may move in a circular pattern around the centers of the fixed sprockets 40A and 40B. In this manner, the orbiting sprockets 30A and 30B orbit along the circumference of their circular orbit path. The orbiting path is shown by the dotted lines in FIGS. 1 and 3.

The connection between the crankshafts 60A and 60B and the driveshaft 70 is a rotationally rigid connection, which is achieved by clamps 64A and 64B on their respective ends of the driveshaft 70. This connection is rotationally rigid such that the circular path of the crankshafts 60A and 60B may rotationally drive the driveshaft 70 as the orbiting sprockets 30A and 30B orbit around the fixed sprockets 40A and 40B respectively.

Driveshaft 70 may also pass through a central portion of the fixed sprockets 40A and 40B. The fixed sprockets 40A and 40B generally remain fixed and do not rotate so that the tension-bearing members 50A and 50B may be placed in tension by the applied torque on the outer levers 20A and 20B. If the fixed sprockets are allowed to rotate, no tension may be introduced into the tension-bearing members and no orbiting motion will be achieved as a result of the torque applied to the outer levers. Therefore, in order for the driveshaft 70 to spin in the present configuration, it should pass through the center of these fixed sprockets 40A and 40B and be allowed to rotate freely with respect to these fixed sprockets. This is achieved in one embodiment by having a hole through the center of the fixed sprockets and respective driveshaft bearings 72A and 72B that supports the driveshaft 70. This arrangement also allows transference of a radial force form the driveshaft 70 to the frame 110. The drive sprocket 80 may be located anywhere along the length of the driveshaft 70; however, for various structural reasons it may be beneficial to locate the drive sprocket 70 at a point between the right and left side of driveshaft bearings 72A and 72B respectively. This drive sprocket 70 should be rotationally rigid with respect to the driveshaft such that the torque applied to the driveshaft 70 by the crank levers 60A and 60B may be transferred into the drive sprocket and afterwards transferred to some kind of a propulsion means.

As discussed above, the crankshafts may be moved inwardly such that they connect on a central side of the fixed sprockets, thus eliminating the need to pass through a central portion of the fixed sprockets.

It should also be appreciated that the fixed sprockets and the orbiting sprockets may be provided in varying shapes, including elliptical shapes so as to coincide with the typical power stroke of the person propelling the system. It should be appreciated that should such elliptical shapes be utilized that a similar number of teeth should exist between the orbiting sprocket and the fixed sprocket such that the orbiting sprocket is not caused to rotate. By having the same number of teeth (or a similar circumference in the case of a belt), the orbiting sprockets do not rotate but instead purely orbit. In this manner, the outer levers maintain a constant orientation with respect to the ground, (that is, they would be parallel to the ground as shown in the present embodiment, regardless of the orbit position). In this manner, the outer levers could be extended almost indefinitely, the ends of which will mimic the motion of the orbiting sprockets and can thus extend the levers and increase torque applied without displacing so much that a rider would be unable to mimic the rotation with his/her limbs.

In addition, as discussed above, the crankshafts 60A and 60B are preferably adjustable in length. This adjustability offers many benefits, including the ability to adjust the system so that both of the right and left side orbiting sprockets have an equal distance from their respective fixed sprockets. In this manner, as they orbit, the rotational moments offset one another and the system remains balanced and does not vibrate or cause "wobble" when orbiting at high speeds. Another benefit realized by having adjustable crankshafts is that proper tension on the respective tension-bearing members can be maintained; otherwise if too much slack is allowed in the respective loops, the tension-bearing members can "work" off the sprockets and thus disable the drive system.

Figure 6:
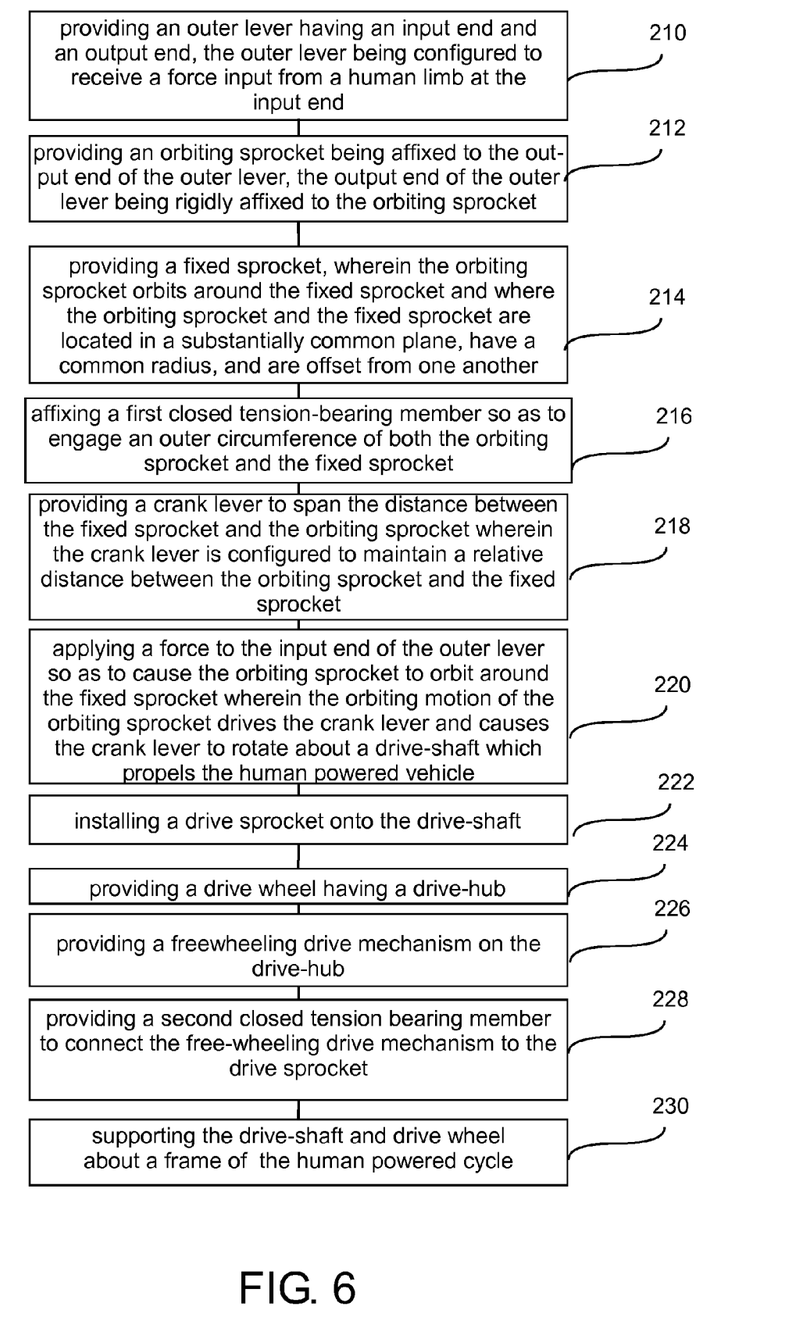
FIG. 6 depicts a flow chart illustrating a method of propelling a human powered vehicle implementing the tri-lever propulsion system of FIG. 1.

FIG. 6 depicts another aspect of the present invention which includes a method for propelling a human powered vehicle using a tri-lever drive system as described above as shown in the flow chart of FIG. 7. This method of propelling the human powered vehicle using the orbiting shaft drive system includes various steps or increments, including the following:

The method can include, at box 210, providing an outer lever having an input end and an output end, the outer lever being configured to receive a force input from a human limb at the input end. 212 illustrates providing an orbiting sprocket being affixed to the output end of the outer lever, the output end of the outer lever being rigidly affixed to the orbiting sprocket. 214 illustrates providing a fixed sprocket, wherein the orbiting sprocket orbits around the fixed sprocket and where the orbiting sprocket and the fixed sprocket are located in a substantially common plane, have a common radius, and are offset from one another. 216 illustrates affixing a first closed tension-bearing member so as to engage an outer circumference of both the orbiting sprocket and the fixed sprocket. 218 illustrates providing a crank lever to span the distance between the fixed sprocket and the orbiting sprocket wherein the crank lever is configured to maintain a relative distance between the orbiting sprocket and the fixed sprocket. 220 shows applying a force to the input end of the outer lever so as to cause the orbiting sprocket to orbit around the fixed sprocket, wherein the orbiting motion of the orbiting sprocket drives the crank lever and causes the crank lever to rotate about a driveshaft which propels the human powered vehicle.

Other various steps or increments may be included and fit within the bounds of the present invention and are included in boxes 222, 224, 226, 228, and 230. These additional steps or increments may include connecting a driveshaft through a central portion of the fixed sprocket in a rotationally free manner, installing a drive sprocket onto the driveshaft, providing a drive wheel having a drive-hub, providing a freewheeling drive mechanism on the drive hub, providing a second closed tension bearing member to connect the free-wheeling drive mechanism to the drive sprocket, and supporting the driveshaft and drive wheel about a frame of the human powered cycle. Each of these additional steps or increments may be provided in any order as well as in any combination. It should be readily appreciated that one of ordinary skill in the art would be capable of translating the motion of a spinning drive shaft into a forward propulsion motion.

In addition, as discussed above, a freewheel may be provided at the drive wheel, however a free-wheel may also be provided at any junction between the point at which a user provides an input source and the point at which the system provides a propulsive force between the vehicle and the surrounding environment. The exemplary freewheel is provided as a free-wheeling drive mechanism which supports the multi-geared cassette on the hub of the drive-wheel. Additionally such free-wheel may be provided as a typical internal gear hub as discussed above.

Also contemplated are the various ways of transferring a rotational inertia or force from one sprocket to another, including chains, belts, driveshafts, intermediate sprockets, etc. Any of the depicted chains may similarly be provided with belts or any other suitable substitution as would be recognized by one of ordinary skill in the art.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A propulsion system for human powered vehicles, comprising:
   an outer lever having an input end and an output end, the outer lever being configured to receive a force input from a human limb at the input end;
   an orbiting sprocket being coupled to the output end of the outer lever, the outer lever extending forwardly from the orbiting sprocket relative to a vehicle powered by the propulsion system;
   a fixed sprocket, wherein the orbiting sprocket orbits around the fixed sprocket, the orbiting sprocket and the fixed sprocket being located in a substantially common plane, and being offset one from another;
   a closed tension-bearing member engaging an outer circumference of both the orbiting sprocket and the fixed sprocket;
   a crank lever spanning a distance between the fixed sprocket and the orbiting sprocket, the crank lever maintaining a relative distance between the orbiting sprocket and the fixed sprocket;
   a driveshaft being co-axial with the fixed sprocket, the driveshaft being free to rotate with respect to the fixed sprocket and the crank lever being fixedly connected to the driveshaft and rotationally connected to the orbiting sprocket;
   a chassis being propelled by the driveshaft;
   a pedal crank rotatably coupled to the chassis and to the outer lever; and
   a pedal rotatably coupled to the pedal crank;
   wherein application of a downward force on the pedal causes an upward force to be applied by the pedal crank to the input end of the outer lever to thereby cause the orbiting sprocket to rotate forwardly in the forward direction of travel of the vehicle, around the fixed sprocket and thereby rotate the crank lever to impart rotation to the driveshaft and propel the chassis.

2. The propulsion system of claim 1, wherein the output end of the outer lever is rigidly affixed to the orbiting sprocket.

3. The propulsion system of claim 1, wherein the orbiting sprocket and the fixed sprocket have a common radius.

4. The propulsion system of claim 1, wherein the closed tension-bearing member comprises a linked chain system.

5. The propulsion system of claim 1, wherein the closed tension-bearing member comprises a belt-drive system.

6. The propulsion system of claim 1, wherein an orbiting shaft passes through a central portion of the orbiting sprocket, and wherein the orbiting sprocket and the orbiting shaft are fixedly coupled together and the output end of the outer lever is coupled to the orbiting sprocket via the orbiting shaft.

7. A leveraged propulsion system for human powered vehicle, comprising:
   an outer lever having an input end and an output end, the outer lever being configured to receive a force input from a human limb at the input end, the outer lever extending forwardly relative to a vehicle powered by the propulsion system;
   an orbiting sprocket being coupled to the output end of the outer lever;
   a fixed sprocket, wherein the orbiting sprocket orbits around the fixed sprocket, the orbiting sprocket and the fixed sprocket being located in a substantially common plane, and being offset one from another;
   a first closed tension-bearing member engaging an outer circumference of both the orbiting sprocket and the fixed sprocket;
   a crank lever spanning a distance between the fixed sprocket and the orbiting sprocket, the crank lever also maintaining a relative distance between the orbiting sprocket and the fixed sprocket,
   a driveshaft being coaxial with the fixed sprocket, the driveshaft being free to rotate with respect to the fixed sprocket and the crank lever being fixedly connected to the driveshaft and rotationally connected to the orbiting sprocket;
   a drive sprocket located on the driveshaft;
   a drive wheel having a drive-hub;
   a freewheel drive device being located on the drive-hub;
   a second closed tension-bearing member connecting the drive sprocket and the freewheel drive device located on the drive-hub;
   a chassis being driven by the drive wheel;
   a pedal crank rotatably coupled to the chassis and to the outer lever; and
   a pedal rotatably coupled to the pedal crank;
   wherein application of a downward force on the pedal causes an upward force to be applied by the pedal crank to the input end of the outer lever to thereby cause the orbiting sprocket to orbit around the fixed sprocket and thereby rotate the crank lever which imparts forward rotation to the driveshaft in the forward direction of travel of the vehicle and thereby provide rotation to the drive wheel which thereby imparts propulsion to the vehicle.

8. The propulsion system of claim 7, wherein the output end of the outer lever is rigidly affixed to the orbiting sprocket.

9. The propulsion system of claim 7, wherein the orbiting sprocket and the fixed sprocket have a common radius.

10. The propulsion system of claim 7, wherein the first and the second closed tension-bearing members comprise a linked chain system.

11. The propulsion system of claim 7, wherein the first and the second closed tension-bearing members comprise a belt-drive system.

12. The propulsion system of claim 7, wherein an orbiting shaft passes through a central portion of the orbiting sprocket, and wherein the orbiting sprocket and the orbiting shaft are fixedly coupled together and the output end of the outer lever is coupled to the orbiting sprocket via the orbiting shaft.

13. The propulsion system of claim 7, wherein the drive wheel is a bicycle wheel.

14. The propulsion system of claim 7, wherein the freewheel drive device of the drive-hub is a indexed bicycle cassette.

15. The propulsion system of claim 7, wherein the free-wheel drive device of the drive-hub is an internal gear hub.

16. A method for propelling a human powered vehicle comprising:

providing an outer lever having an input end and an output end, the outer lever being rotatably coupled to a pedal crank at the input end, with a pedal rotatably coupled to the pedal crank, the pedal being configured to receive a downward force input from a human limb;

providing an orbiting sprocket being affixed to the output end of the outer lever, the output end of the outer lever being rigidly affixed to the orbiting sprocket;

providing a fixed sprocket, wherein the orbiting sprocket orbits around the fixed sprocket and where the orbiting sprocket and the fixed sprocket are located in a substantially common plane, have a common radius, and are offset from one another;

affixing a first closed tension-bearing member so as to engage an outer circumference of both the orbiting sprocket and the fixed sprocket;

providing a crank lever to span a distance between the fixed sprocket and the orbiting sprocket wherein the crank lever is configured to maintain a relative distance between the orbiting sprocket and the fixed sprocket; wherein application of a downward force to the pedal causes the pedal crank to apply an upward force to the input end of the outer lever to thereby cause the orbiting sprocket to orbit forwardly around the fixed sprocket in the forward direction of travel of the vehicle powered by the propulsion system.

17. The method of claim 16, further comprising:
connecting a driveshaft through a central portion of the fixed sprocket in a rotationally free manner.

18. The method of propelling a human powered vehicle of claim 17, further comprising:

installing a drive sprocket onto the driveshaft;

providing a drive wheel having a drive-hub;

providing a freewheeling drive mechanism on the drive hub providing a second closed tension bearing member to connect the free-wheeling drive mechanism to the drive sprocket; and supporting the driveshaft and drive wheel about a frame of the human powered cycle.

19. The method of claim 18, wherein the free-wheeling drive mechanism is a multi-geared cassette on a freewheel.

20. The method of claim 18, wherein the free-wheeling drive mechanism is an internal gear hub.

* * * * *